United States Patent [19]

Sekizawa et al.

[11] 4,401,167
[45] Aug. 30, 1983

[54] VIBRATORY TOOL WITH A VIBRATION PROOF MECHANISM FOR THE HANDLE THEREOF

[75] Inventors: Masaaki Sekizawa; Yasuo Sasaki, both of Katsuta, Japan

[73] Assignee: Hitachi Koki Company, Limited, Ote, Japan

[21] Appl. No.: 264,176

[22] Filed: May 15, 1981

[30] Foreign Application Priority Data

Jul. 18, 1980 [JP] Japan .................................. 55-99012

[51] Int. Cl.³ ............................................ E21B 12/00
[52] U.S. Cl. .............................. 173/162 H; 248/573; 248/632
[58] Field of Search ...................... 173/162 R, 162 H; 16/116 R; 74/551.1, 551.9; 248/632, 544, 573, 580, 602; 267/137, 141, 141.2

[56] References Cited

U.S. PATENT DOCUMENTS

| 2,014,466 | 9/1935 | Cheyney | 248/632 |
| 2,035,643 | 3/1936 | Douglass et al. | 173/162 |
| 3,652,074 | 3/1972 | Frederickson et al. | 173/162 X |
| 3,698,455 | 10/1972 | Frederickson et al. | 173/162 X |
| 3,845,557 | 11/1974 | Bailey | 173/162 X |

FOREIGN PATENT DOCUMENTS

| 111396 | 9/1940 | Australia | 248/358 |
| 112786 | 1/1918 | United Kingdom . | |
| 538638 | 8/1941 | United Kingdom | 267/141 |

Primary Examiner—Robert C. Watson
Assistant Examiner—Robert P. Olszewski
Attorney, Agent, or Firm—Pollock, Vande Sande & Priddy

[57] ABSTRACT

At least two vibration proof elements are interposed between a tool body and the handle thereof. Each of the elements has a first supporting member connected to the handle, and two rubber blocks interposed between the first and second supporting members so that the element functions as a shock absorber. The first supporting member is partially received in the second supporting member in such a manner that the first supporting member is reciprocally movable with respect to the second supporting member when a force is applied to the element in a longitudinal direction of the tool body. Each of the first and second supporting members has a U-shaped portion so that the inner surface of the second supporting member abuts the outer surface of the first supporting member thus preventing the handle from excessively rotating about an axis perpendicular to the longitudinal axis, and passing through the elements.

8 Claims, 4 Drawing Figures

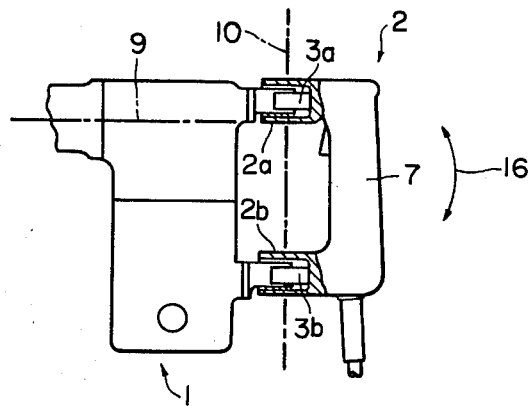
FIG. 1
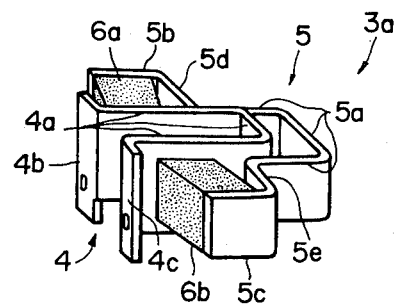
FIG. 2
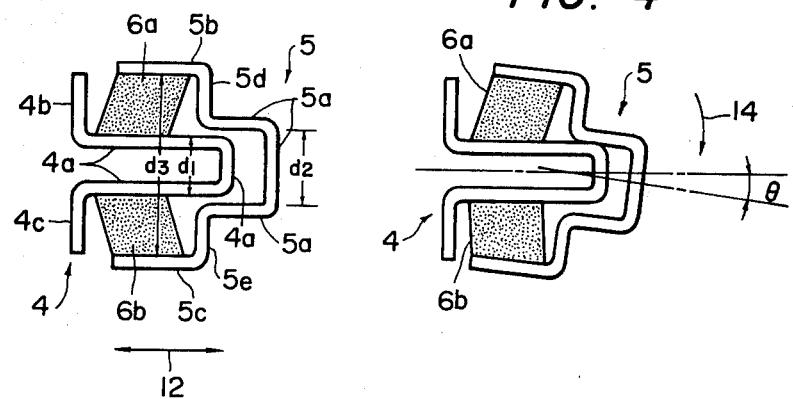
FIG. 3
FIG. 4

VIBRATORY TOOL WITH A VIBRATION PROOF MECHANISM FOR THE HANDLE THEREOF

FIELD OF THE INVENTION

This invention generally relates to vibratory tools, such as electric hammers, and more particularly, the present invention relates to an improvement in a vibration proof mechanism of a vibratory tool, which mechanism is interposed between a vibratory tool body and a handle thereof.

BACKGROUND OF THE INVENTION

In a conventional vibratory tool, such as an electric hammer, a vibration proof mechanism having more than one element made of an elastic material is interposed between the vibratory tool body and the handle thereof. The number of the vibration proof elements is usually two, and the two elements are arranged on an axis which is substantially perpendicular to the longitudinal axis of the vibratory tool body. The perpendicular axis is referred to as a transverse axis. Since the grip of the handle is spaced from the transverse axis, the handle is apt to receive a moment of rotation with respect to the transverse axis when the vibratory tool is operated. Because of this moment of rotation, the handle is unsteady, and if the handle is very unsteady, it is difficult to handle the vibratory tool to effect disirable machining or operation. Therefore, the stiffness of the elastic material has to be high enough so that the handle is steady in operation. However, as an elastic material having a relatively high stiffness is used, or as the structure of the vibration proof mechanism is designed to have a relatively high stiffness as a whole, the vibration proof mechanism does not satisfactorily work, and thus vibrations of relatively high amplitude are transmitted to the grip of the handle.

In order to prevent the handle from rotating in the above-mentioned direction, it is possible to widen the width of a member supporting the elastic material in the direction that the handle tends to rotate. However, if the width of the supporting member were widened so that the handle is prevented from rotating, the size of the vibration proof mechanism would increase and thus the vibratory tool would be bulky.

SUMMARY OF THE INVENTION

The present invention has been developed in order to remove the above-mentioned disadvantages and drawbacks inherent to the conventional vibration proof mechanism of vibratory tools.

It is, therefore, a primary object of the present invention to provide a new and useful vibratory tool with a vibration proof mechanism for the handle thereof, thereby the handle is prevented from rotating over a given angle with respect to an axis passing through a plurality of elements of the vibration proof mechanism.

Another object of the present invention is to provide a vibratory tool with a vibration proof mechanism for the handle thereof, thereby the transmission of vibrations from the vibratory tool body to the handle is effectively prevented.

A further object of the present invention is to provide a vibratory tool having a vibration proof mechanism between the vibratory tool body and the handle thereof, which vibration proof mechanism is compact in size.

A still further object of the present invention is to provide a vibratory tool with a vibration proof mechanism for the handle thereof, in which the stiffness of the vibration proof mechanism can be made low so that vibrations from the vibratory tool is effectively prevented from transmitting to the handle.

A still further object of the present invention is to provide a vibratory tool with a vibration proof mechanism for the handle thereof, which vibratory tool is easy to handle.

A still further object of the present invention is to provide a vibratory tool with a vibration proof mechanism for the handle thereof, which vibratory tool can be operated safely.

In accordance with the present invention the vibration proof mechanism connecting the vibratory tool body to the handle thereof comprises two or more elements which are arranged on an axis perpendicular to the longitudinal axis of the vibratory tool body, i.e. the main vibratory axis. Each of the elements has a first supporting member fixedly connected to the vibratory tool body, a second supporting member fixedly connected to the handle, and shock absorbing means interposed between the first and second supporting members. One of the first and second supporting members is partially received in the other in such a manner that the second supporting member is movable in the direction of the longitudinal axis of the vibratory tool body with respect to the first supporting member. The size of each of the first and second supporting members is selected so that the partially received supporting member abuts against the other supporting member to prevent the handle from rotating over a given angle about an axis perpendicular to the longitudinal axis of the vibratory tool body, and passing through the elements.

BRIEF DESCRIPTION OF THE DRAWINGS

These and other objects and features of the present invention will be more readily apparent from the following detailed description of the preferred embodiment taken in conjunction with the accompanying drawings in which:

FIG. 1 is a schematic partial side view of an embodiment of a vibratory tool according to the present invention;

FIG. 2 is a schematic perspective view of the vibration proof element shown in FIG. 1;

FIG. 3 is a schematic top plan view of the vibration proof element of FIG. 2 in receipt of a force in the direction of the longitudinal axis of the vibratory tool body of FIG. 1; and FIG. 4 is a schematic explanatory view of the vibration proof element of FIG. 3 showing how one of the two supporting members abuts the other to prevent the excessive rotation of the handle shown in FIG. 1.

DETAILED DESCRIPTION OF THE PREFERRED EMBODIMENTS

Referring to FIG. 1, a schematic partial side view of a vibratory tool, such as an electric hammer, is shown. The vibratory tool comprises a vibratory tool body 1, a handle 2 and a vibration proof mechanism generally indicated at a reference 3. The vibration proof mechanism 3 is interposed between the vibratory tool body 1 and the handle 2, and is fixedly connected to both the body 1 and the handle 2 so that the vibration proof mechanism 3 functions as a connector or a joint therebetween. The vibration proof mechanism 3 has two elements 3a and 3b which are spaced in a direction perpendicular to the longitudinal or main axis 9 of the vibratory tool 1. Namely, the two elements 3a and 3b are arranged on an axis 10 which intersects the longitudinal axis 9 at substantially 90 degrees. Although the entire view of the vibratory tool body 1 is not shown for simplicity, it will be understood that a given force is applied via the vibration proof mechanism 3, i.e. the above-mentioned two elements 3a and 3b, from the handle 2 to the vibratory tool body 1 in the direction of the longitudinal axis 9 during operation. The handle 2 has a grip portion 7 at the middle thereof, and the above-mentioned two elements 3a and 3b of the vibration proof mechanism 3 is connected to the handle 2 in the vicinity of both ends thereof.

The vibration proof mechanism 3 is shown by way of a partially cross-sectional view in FIG. 1, and actually, each of the vibration proof elements 3a and 3b is enclosed or covered by suitable covers 2a and 2b which are integrally formed with the handle 2. Each of the elements 3a and 3b has the same structure as that of the other, and therefore, the structure and operation of the elements 3a and 3b will be described in connection with one element 3a with reference to FIG. 2 which is a perspective view, and FIGS. 3 and 4 which are top plan views of the element 3a in different situations.

As shown in FIG. 2, the vibration proof element 3a comprises a first supporting member 4, a second supporting member 5 both made of a metal, and two rubber blocks 6a and 6b. Each of the rubber blocks 6a and 6b has a rectangular prism shape. Of course rubber blocks of other shapes may be used therefor. Furthermore, other elastic material may be used in place of rubber. As shown in FIG. 1, the first supporting member 4 is fixedly connected to the vibratory tool body 1, while the second supporting member 5 is fixedly connected to the handle 2. The first supporting member 4 has a U-shaped center portion 4a and two edge portions 4b and 4c which are substantially perpendicular to the U-shaped center portion 4a. The first supporting member 4 is connected to the vibratory tool body 2 at the edge portions 4b and 4c. The U-shaped center portion 4a has a pair of parallel plates (no numeral) and a bottom portion (no numeral) connected to one end of each of the parallel plates, and the edge portions 4b and 4c respectively extend outwardly from the other ends of the pair of parallel plates in opposite directions. The distance between the outer surfaces of the pair of parallel plates of the U-shaped center portion 4a is indicated by d1. This distance d1 is referred to as the outer width of the U-shaped center portion 4a. The above-mentioned two rubber blocks 6a and 6b are respectively attached, at one end thereof, to the outer surfaces of the pair of parallel plates by means of a suitable adhesive.

On the other hand, the second supporting member 5 has a pair of parallel portions 5b and 5c facing each other, a U-shaped center portion 5a, and a pair of middle portions 5d and 5e respectively connected between the U-shaped center portion 5a and the pair of parallel portions 5b and 5c. The middle portions 5d and 5e respectively extend outwardly from the edges of the U-shaped center portion 5a in the same manner as the above-mentioned edge portions 4b and 4c of the first supporting member 4. The U-shaped center portion 5a has a bottom portion connecting two parallel plates, and the second supporting member is connected to the handle 2 at the bottom portion of the U-shaped center portion 5a.

The distance or interval between the two parallel plates constituting the U-shaped center portion 5a of the second supporting member 5 is indicated by d2, while the distance between the two parallel portions 5b and 5c of the second supporting member 5 is indicated by d3. The distance d2 is referred to as the inner width of the U-shaped center portion 5a. As best seen in FIG. 3, thse distances d1 to d3 have the following relationship therebetween.

$$d1 < d2 < d3$$

The other ends of the respective rubber blocks 6a and 6c are attached to the inner surfaces of the parallel plates 5b and 5c of the second supporting member 5. In detail, the first and second supporting members 4 and 5 are connected by the two rubber blocks 6a and 6b so that a portion of the U-shaped center portion 4a, including the bottom thereof, of the first supporting member 4 is received in the inside of the other U-shaped center portion 5a of the second supporting member 5. As will be understood from FIG. 3, the height of each of the rubber blocks 6a and 6b corresponds to d3−d1/2). With this arrangement, when the second supporting member 5 moves in the direction of an arrow 12, which is parallel to the longitudinal axis 9 of FIG. 1, with respect to the first supporting member 4, these first and second supporting members 4 and 5 do not abut each other. In other words, in operation of the vibratory tool, if the handle 2 is applied with a force in the direction of the longitudinal axis 9, the first supporting member 4 simply reciprocates in the same direction without coming into contact with the second supporting member 5. The outer surface of the bottom of the U-shaped center portion 4a of the first supporting member 4 is spaced from the inner surface of the bottom of the other U-shaped center portion 5a of the second supporting member 5 by a given distance so that these two supporting members 4 and 5 do not contact each other even when a possible maximum force is applied to the vibration proof element 3a in the longitudinal axis direction.

Reference is now made to FIG. 4 which shows the vibration proof element 3a under the condition that a rotational force is applied to the second supporting member 5 in the direction of a curved arrow 14. Namely, when a force is applied to the handle 2 in a direction perpendicular to both axes 9 and 10 of FIG. 1, the second supporting member 5 connected to the handle 2 tends to rotate in the direction of the curved arrow 14 of FIG. 4. Although the second supporting member 5 rotates slightly as much as an angle indicated by θ, the second supporting member 5 cannot rotate beyond the angle θ because the inner surface of the U-shaped center portion 5a of the second support member 5 abuts the outer surface of the other U-shaped center portion 4a of the first supporting member 4. Since the outer surface of the U-shaped center portion 4a is in contact, in the vicinity of the bottom of the U-shaped center portion 4a, with the inner surface of the U-shaped center portion 5a of the second supporting member 5, the second supporting member 5, and therefore, the handle 2 does not excessively rotate around the axis 10 of FIG. 1.

With this arrangement, it is possible to reduce the stiffness of the vibration proof elements 3a and 3b of the vibration proof mechanism 3 compared to that of conventional vibratory tools. Therefore, the vibration proof or shock absorbing characteristic can be improved. In order to reduce the stiffness of the vibration proof elements 3a and 3b the cross-sectional area of each of the rubber blocks 6a and 6b is reduced compared to the conventional vibratory tools. Therefore, the size of the elements 3a and 3b can be reduced accordingly. If desired, however, rubber or other elastic blocks having a stiffness lower than that of the shock absorbing material used in the conventional tools may be used in order to increase the efficiency of shock absorption.

Apart from the rotation of the handle 2 in the direction of the curved arrow 14 of FIG. 4, the handle 2 is also prevented from rotating in the direction indicated by a curved arrow 16 of FIG. 1 with respect to an axis (not shown) perpendicular to both the longitudinal axis 9 and the transverse axis 10 because the two vibration proof elements 3a and 3b are widely spaced as shown in FIG. 1.

In the above, although the first supporting member 4 received in the second supporting member 5 is connected to the vibratory tool body 1, while the second supporting member is connected to the handle 2, the connecting direction of each of the elements 3a and 3b may be reversed so that the first supporting member 4 is connected to the handle 2, while the second supporting member 5 is connected to the vibratory tool body 1.

The above-described embodiment of the present invention is just an example of the present invention, and therefore, many modifications and variations may be made without departing from the spirit of the present invention. Although, the elastic blocks 6a and 6b are used to receive shearing stress, such elastic blocks may be used to receive compression stress.

What is claimed is:

1. A vibratory tool with a vibration proof mechanism for the handle thereof, comprising a vibratory tool body, a handle for operating said vibratory tool, and a vibration proof mechanism interposed between said vibratory tool body and said handle, said vibration proof mechanism having a plurality of elements arranged in a direction substantially perpendicular to a longitudinal axis of said vibratory tool, each of said elements having first and second supporting members respectively connected fixedly to said vibratory tool body and to said handle or vice versa, and shock absorbing means made of an elastic material interposed between said first and second supporting members, said first supporting member being partially received in said second supporting member in such a manner that said second supporting member is movable in the direction of said longitudinal axis of said vibratory tool body with respect to said first supporting member, characterized in that said shock absorbing means comprises at least a pair of elastic members aligned in a line which is substantially perpendicular to a plane including the longitudinal axis of said vibratory tool body and said direction which is perpendicular to said longitudinal axis, in that said first and second supporting members are spaced from each other so that vibrations do not directly propagate therethrough and they do not come into contact with each other unless said second supporting member is rotated over a predetermined angle in a given direction with respect to said first supporting member, and in that said first and second supporting members each having a portion parallel to said longitudinal axis of said vibratory tool, and further in that the space between said first and second supporting members and the configuration of said first and second supporting members are selected so that the parallel portion of each of said first and second supporting members come into contact with each other to prevent over rotation of said handle.

2. A vibratory tool as claimed in claim 1, characterized in that said first supporting member has a U-shaped center portion and a pair of edge portions which are substantially perpendicular to said U-shaped portion, and in that said second supporting member has a pair of parallel portions facing each other, a U-shaped center portion and a pair of middle portions respectively connected between the U-shaped center portion and said pair of parallel portions, said first and second supporting members being respectively connected to one of said vibratory tool body and said handle at said pair of edge portions of said first supporting member and at the bottom portion of said U-shaped center portion of said second supporting member.

3. A vibratory tool as claimed in claim 2, characterized in that the outer width of said U-shaped center portion of said first supporting member is smaller than the inner width of said U-shaped center portion of said second supporting member.

4. A vibratory tool as claimed in claim 3, characterized in that the distance between said pair of parallel portions of said second supporting member is greater than said inner width of said U-shaped center portion of said second supporting member.

5. A vibratory tool as claimed in claim 2, characterized in that a portion of said U-shaped center portion of said first supporting member is received in the inside of said U-shaped center portion of said second supporting member without coming into contact with said second supporting member when no force is applied to said first and second supporting members.

6. A vibratory tool as claimed in claim 2, characterized in that said first and second supporting members are spaced in said longitudinal axis direction so that said first and second supporting members do not come into contact with each other when a possible maximum force is applied to said first and second supporting members in said longitudinal axis direction.

7. A vibratory tool as claimed in claim 2, characterized in that said shock absorbing means of each of said elements comprises two blocks respectively interposed between the outer surfaces of said U-shaped center portion of said first supporting member and the inner surfaces of said pair of parallel portions of said second supporting member.

8. A vibratory tool as claimed in claim 7, characterized in that said blocks are made of rubber and have a prism-like shape.

* * * * *